(12) United States Patent
Mori

(10) Patent No.: US 12,347,835 B2
(45) Date of Patent: Jul. 1, 2025

(54) ALL-SOLID-STATE BATTERY MODULE, ELECTRONIC DEVICE, AND METHOD FOR MANUFACTURING ALL-SOLID-STATE BATTERY MODULE

(71) Applicant: MURATA MANUFACTURING CO., LTD., Kyoto (JP)

(72) Inventor: Yasushi Mori, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 550 days.

(21) Appl. No.: 17/879,136

(22) Filed: Aug. 2, 2022

(65) Prior Publication Data

US 2022/0367929 A1    Nov. 17, 2022

Related U.S. Application Data

(63) Continuation of application No. PCT/JP2021/000421, filed on Jan. 8, 2021.

(30) Foreign Application Priority Data

Feb. 4, 2020    (JP) .................. 2020-016867

(51) Int. Cl.
*H01M 10/44*    (2006.01)
*H01M 10/42*    (2006.01)
(Continued)

(52) U.S. Cl.
CPC ....... *H01M 10/446* (2013.01); *H01M 10/425* (2013.01); *H01M 50/284* (2021.01);
(Continued)

(58) Field of Classification Search
CPC ............. H01M 10/446; H01M 50/284; H01M 10/425; H01M 2010/4271; H02J 7/0029; H02J 7/0068
See application file for complete search history.

(56) References Cited

U.S. PATENT DOCUMENTS

| 5,994,878 A | 11/1999 | Ostergaard et al. |
| 2007/0257635 A1 | 11/2007 | Yang |

(Continued)

FOREIGN PATENT DOCUMENTS

| JP | 2003503992 A | 1/2003 |
| JP | 2007306787 A | 11/2007 |

(Continued)

OTHER PUBLICATIONS

Japanese Office Action issued Aug. 22, 2023 in corresponding Japanese Application No. 2021-575671.

(Continued)

*Primary Examiner* — Sarah A. Slifka
(74) *Attorney, Agent, or Firm* — K&L Gates LLP

(57) ABSTRACT

An all-solid-state battery module includes an all-solid-state battery; a first electric path connected to a positive electrode of the all-solid-state battery; a second electric path connected to a negative electrode of the all-solid-state battery; a circuit board on which the all-solid-state battery is mounted; and a charge/discharge control switch connected on the first electric path or the second electric path, in which a predetermined charging terminal is connected between the charge/discharge control switch and the positive electrode or between the charge/discharge control switch and the negative electrode.

7 Claims, 6 Drawing Sheets

(51) Int. Cl.
  *H01M 50/284*  (2021.01)
  *H02J 7/00*    (2006.01)
(52) U.S. Cl.
  CPC .......... *H02J 7/0029* (2013.01); *H02J 7/0068* (2013.01); *H01M 2010/4271* (2013.01)

(56) References Cited

U.S. PATENT DOCUMENTS

2009/0087739 A1   4/2009   Takahashi
2017/0256816 A1   9/2017   Watanabe et al.

FOREIGN PATENT DOCUMENTS

JP   2017157447 A   9/2017
WO   2007086289 A1  8/2007

OTHER PUBLICATIONS

International Search Report of corresponding PCT application PCT/JP2021/000421, dated Feb. 9, 2021.
Japanese Office Action issued Dec. 19, 2023 in corresponding Japanese Application No. 2021-575671.

ALL-SOLID-STATE BATTERY MODULE, ELECTRONIC DEVICE, AND METHOD FOR MANUFACTURING ALL-SOLID-STATE BATTERY MODULE

CROSS REFERENCE TO RELATED APPLICATIONS

The present application is a continuation of PCT patent application no. PCT/JP2021/000421, file on Jan. 8, 2021, which claims priority to Japanese patent application no. JP2020-016867, filed on Feb. 4, 2020, the entire contents of which are being incorporated herein by reference.

BACKGROUND

The present application relates to an all-solid-state battery module, an electronic device, and a method for manufacturing an all-solid-state battery module.

In a case where a battery is mounted on a substrate by a reflow device, other electronic components are not electrically connected because they are not reflowed yet. In a case where the battery is in a charged state at a time of reflow, a potential from the battery is applied to the electronic components when solder paste melts and the electronic components and a board land are connected. Since an electronic component such as an integrated circuit (IC) is usually created on the premise that the electronic component is powered on while being connected to the ground after being mounted, the electronic component may undesirably break when a potential is applied to the other terminal of the electronic component that is not connected to the ground. In view of the above, in a technique described, a battery in a discharged state of approximately 0 V is mounted on a substrate, and then the battery is charged.

SUMMARY

The present application relates to an all-solid-state battery module, an electronic device, and a method for manufacturing an all-solid-state battery module.

In the technique described in Background section, the battery needs to be in a discharged state of approximately 0 V. Discharging the once charged battery to approximately 0 V may degrade the battery. In addition, it is considered that an all-solid-state battery that is expected to be widely used in the future is often mounted on a substrate as it is. A module including an all-solid-state battery usually has a protection IC that performs an operation for ensuring safety. The protection IC generally has a function of prohibiting charging of a battery of approximately 0 V. Therefore, there is a problem that if the all-solid-state battery of approximately 0 V is mounted on a substrate by reflow or the like, the all-solid-state battery cannot be charged due to the operation of the protection IC and cannot be used as a battery.

Therefore, the present application relates to providing an all-solid-state battery module, an electronic device, and a method for manufacturing an all-solid-state battery module that make it possible to safely start using an all-solid-state battery without deteriorating the all-solid-state battery according to an embodiment.

The present application provides, in an embodiment, an all-solid-state battery module including:
an all-solid-state battery;
a first electric path connected to a positive electrode of the all-solid-state battery;
a second electric path connected to a negative electrode of the all-solid-state battery;
a circuit board on which the all-solid-state battery is mounted; and
a charge/discharge control switch connected on the first electric path or the second electric path, in which
a predetermined charging terminal is connected between the charge/discharge control switch and the positive electrode or between the charge/discharge control switch and the negative electrode.

The present application provides, in an embodiment, an electronic device including:
a case; and
an all-solid-state battery module housed in the case, in which
the all-solid-state battery module includes
an all-solid-state battery,
a first electric path connected to a positive electrode of the all-solid-state battery,
a second electric path connected to a negative electrode of the all-solid-state battery,
a circuit board on which the all-solid-state battery is mounted, and
a charge/discharge control switch connected on the first electric path or the second electric path, and
a predetermined charging terminal is connected between the charge/discharge control switch and the positive electrode or between the charge/discharge control switch and the negative electrode.

The present provides, in an embodiment, a method for manufacturing an all-solid-state battery module, the method including:
mounting an all-solid-state battery having no potential on a circuit board; and
charging and activating the all-solid-state battery via a predetermined charging terminal connected between a charge/discharge control switch and a positive electrode or a negative electrode of the all-solid-state battery, the charge/discharge control switch being connected on a first electric path connected to the positive electrode of the all-solid-state battery or on a second electric path connected to the negative electrode of the all-solid-state battery.

According to an embodiment of the present application, it is possible to safely start using an all-solid-state battery without degrading the all-solid-state battery. Note that the contents of the present application are not to be construed as being limited by the effects exemplified and described herein.

DETAILED DESCRIPTION

Hereinafter, the present application will be described with further detail including with reference to the drawings.

The present application described herein includes preferred specific examples according to an embodiment, and the content of the present application is not limited thereto.

Figure 1:
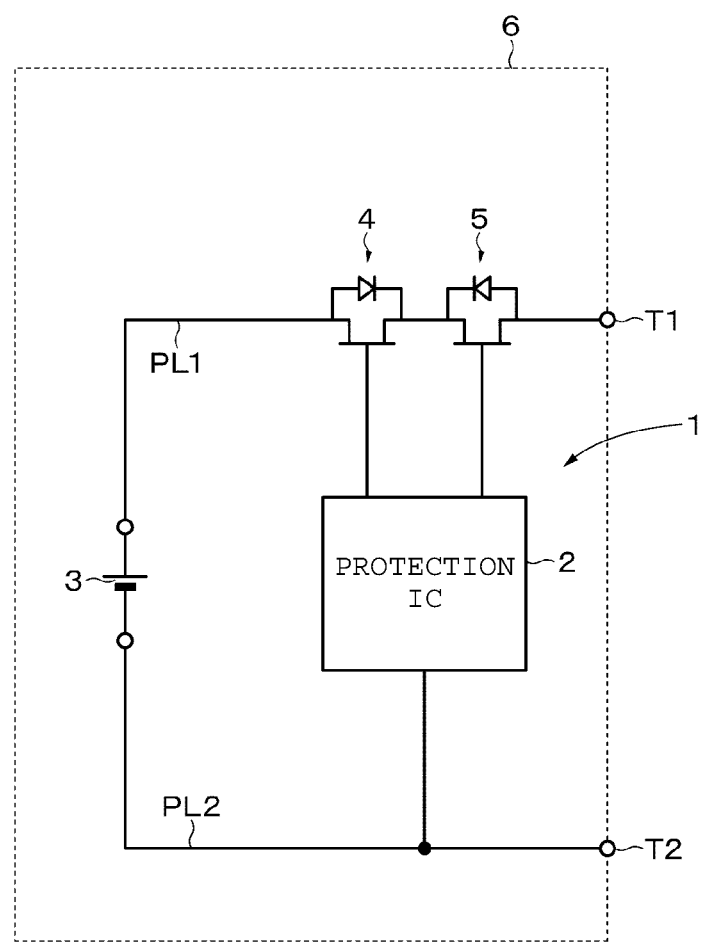
FIG. 1 is a diagram for explaining a configuration of a typical all-solid-state battery module.

First, in order to facilitate understanding of the present application, a typical all-solid-state battery module will be described with reference to FIG. 1. As illustrated in FIG. 1, a typical all-solid-state battery module (all-solid-state battery module 1) includes a protection IC 2, an all-solid-state battery 3, a charge control switch 4, and a discharge control switch 5. A power line PL1 is led out from a positive electrode side of the all-solid-state battery 3, and a positive electrode terminal T1 is connected to the power line PL1. A power line PL2 is led out from a negative electrode side of the all-solid-state battery 3, and a negative electrode terminal T2 is connected to the power line PL2.

The all-solid-state battery module 1 is mounted on a circuit board 6 in a state where the all-solid-state battery 3 has no potential (a state of 0 V or substantially 0 V). After the mounting, a process of charging the all-solid-state battery 3 (hereinafter referred to as initial charging as appropriate) is performed as a process of making the all-solid-state battery 3 usable as a battery, that is, a process of activating the all-solid-state battery 3. The initial charging is performed by connecting a charging device to the positive electrode terminal T1 and the negative electrode terminal T2. The initial charging is performed, for example, before shipment of the all-solid-state battery module 1.

However, since the all-solid-state battery 3 has no potential, the protection IC 2 turns off the charge control switch 4 to prohibit charging of the all-solid-state battery 3. Therefore, there is a problem that the initial charging of the all-solid-state battery 3 cannot be performed, and it is impossible to start using the all-solid-state battery module 1 including the all-solid-state battery 3. An embodiment of the present application accomplished in view of the problem will be described in detail below.

Figure 2:
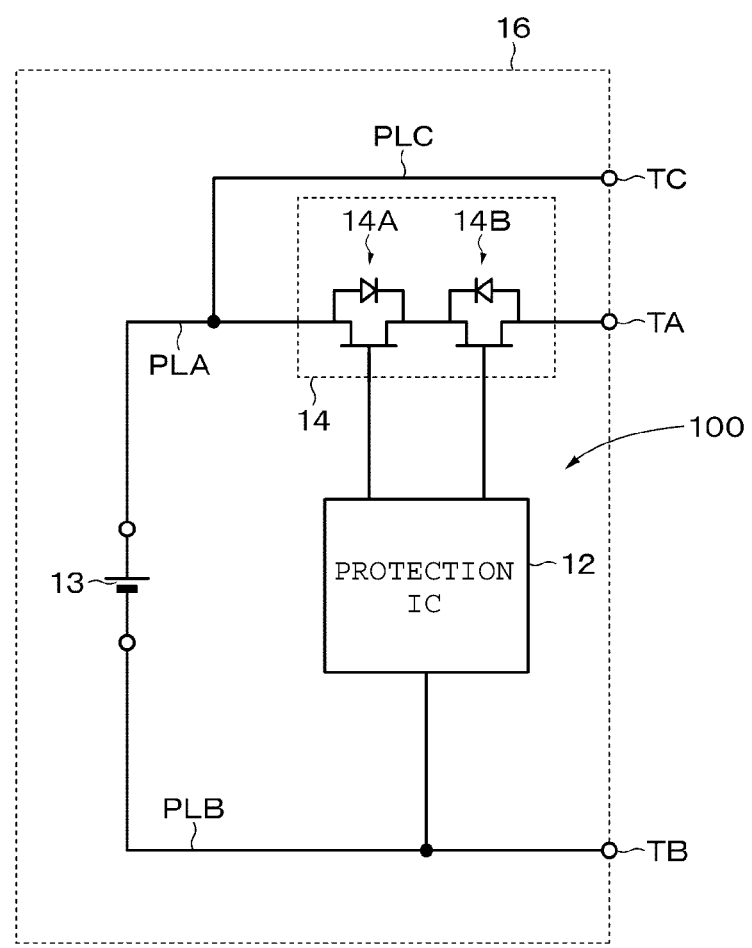
FIG. 2 is a diagram illustrating a configuration example of an all-solid-state battery module according to an embodiment.

FIG. 2 is a diagram illustrating a configuration example of an all-solid-state battery module (all-solid-state battery module 100) according to an embodiment. As illustrated in FIG. 2, the all-solid-state battery module 100 includes a protection IC 12, an all-solid-state battery 13, and a charge/discharge control switch 14. The charge/discharge control switch 14 includes a charge control switch 14A and a discharge control switch 14B.

A power line PLA, which is an example of a first electric path (meaning a path of an electric circuit), is connected to a positive electrode of the all-solid-state battery 13, and a positive electrode terminal TA is led out via the power line PLA. A power line PLB, which is an example of a second electric path, is connected to a negative electrode of the all-solid-state battery 13, and a negative electrode terminal TB is led out via the power line PLB. The all-solid-state battery module 100 includes a circuit board 16 on which the all-solid-state battery 13 is mounted.

The protection IC 12 functions as a charge/discharge control unit that controls charge/discharge by appropriately turning on/off the charge/discharge control switch 14. For example, in a case where the protection IC 12 determines that the all-solid-state battery 13 can be charged and discharged without any problem, for example, without abnormality, the protection IC 12 turns on the charge control switch 14A and the discharge switch 14B. In a case where it is necessary to prohibit charge, for example, in a case where a voltage of the all-solid-state battery 13 reaches an overcharge prohibition voltage, the protection IC 12 turns off at least the charge control switch 14A. In a case where it is necessary to prohibit discharge, for example, in a case where the voltage of the all-solid-state battery 13 reaches an overdischarge prohibition voltage, the protection IC 12 turns off at least the discharge control switch 14B. In a case where the all-solid-state battery 13 is deeply discharged and reaches a recharge prohibition region, the protection IC 12 turns off the charge control switch 14A and the discharge control switch 14B to stop charge and discharge. Note that the protection IC 12 may perform other known protection operations such as overcurrent detection.

Examples of the all-solid-state battery 13 include metal ion all-solid-state batteries such as a lithium ion all-solid-state battery, a sodium ion all-solid-state battery, and a calcium ion all-solid-state battery. In an embodiment, as the all-solid-state battery 13, an all-solid-state battery having a known structure and a known material can be applied. The "all-solid-state battery" as used herein refers to a secondary battery having at least a solid electrolyte layer, and not all constituent elements thereof need be solid.

The charge control switch 14A and the discharge control switch 14B are switches whose on/off is controlled by the protection IC 12. As the charge control switch 14A and the discharge control switch 14B, for example, a field effect transistor (FET) can be used. In an embodiment, the charge/discharge control switch 14 is connected on the power line PLA.

One feature of the all-solid-state battery module 100 according to an embodiment lies in that a power line PLC, which is an example of a third electric path, is connected between the charge/discharge control switch 14 and the positive electrode of the all-solid-state battery 13. A terminal TC is led out via the power line PLC. The terminal TC is a predetermined charging terminal used for initial charging.

One or more of the positive electrode terminal TA, the negative electrode terminal TB, and the terminal TC may be a terminal physically derived from the all-solid-state battery 13 itself or may be a land or the like provided on the circuit board 16.

The all-solid-state battery module 100 described above is mounted on the circuit board 16 together with other electronic components. The circuit board 16 on which the all-solid-state battery module 100 and other appropriate electronic components are mounted is applied to various electronic devices.

Next, a method of initial charging of the all-solid-state battery module 100 will be described. In a case where initial charging is performed on the all-solid-state battery module 100, a charger is connected to the terminal TC and the negative electrode terminal TB to perform initial charging. The charge/discharge control switch 14 is not present on an electric path extending from the terminal TC to the positive electrode of the all-solid-state battery 13 via the power line PLC. Therefore, the initial charging can be also performed in a state where the charge control switch 14A is off.

After the initial charging described above, the all-solid-state battery module 100 is used while connecting the positive electrode terminal TA and the negative electrode terminal TB to an appropriate load as usual. However, if the terminal TC remains usable, charging may be performed via the terminal TC again without passing through the charge control switch 14A or power may be output from the terminal TC, leading to an unfavorable state.

In view of this, in an embodiment, after the initial charging, a process of restricting use of the terminal TC from an outside of a case in which the all-solid-state battery module 1 is housed is performed. Note that the process of restricting use includes not only a process of making the terminal TC physically unusable, but also a process of making the terminal TC substantially unusable, that is, a process of preventing power from being supplied to the all-solid-state battery 13 via the terminal TC or preventing power from being output from the all-solid-state battery 13 via the terminal TC when the terminal TC is used. Hereinafter, a specific example of the process will be described.

For example, the all-solid-state battery module 100 illustrated in FIG. 2 is housed in a case (exterior case) of an electronic device. In this case, the terminal TC is configured not to be exposed to an outside of the case. This can prevent the terminal TC from being accidentally used or touched by a user.

Alternatively, the terminal TC may be hidden by attaching an adhesive sheet, label, or the like to a portion including the terminal TC. This can prevent the terminal TC from being accidentally used or touched by a user.

Figure 3:
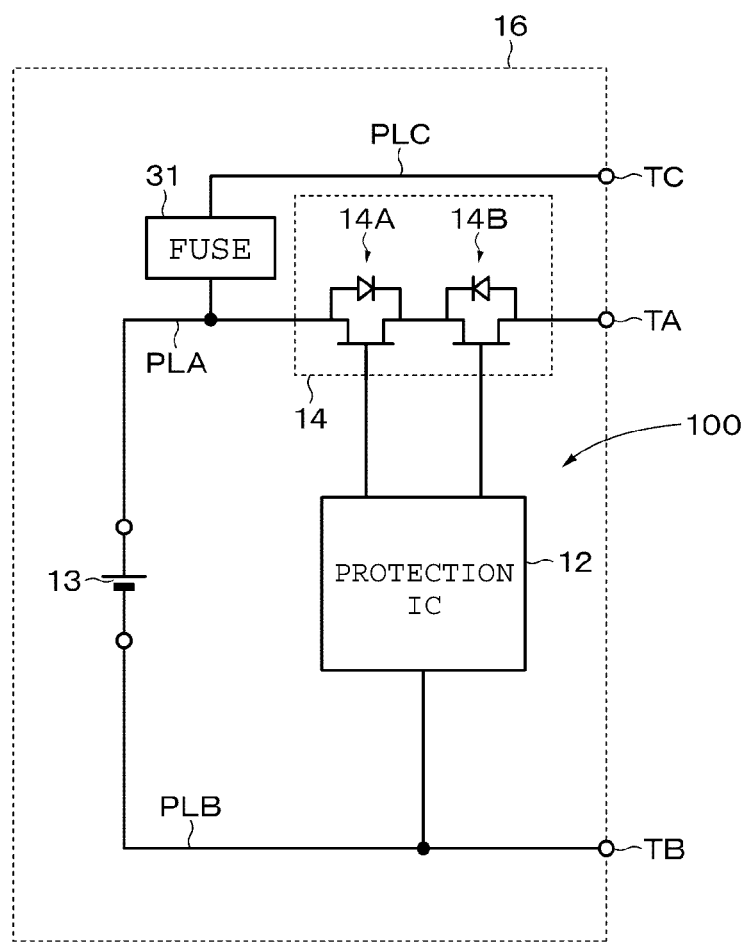
FIG. 3 is a diagram to be referred to when an example of a process of making a charging terminal according to an embodiment unusable is described.

Alternatively, the power line PLC may be configured to be cuttable, and this cuttable power line PLC may be cut. The power line PLC is, for example, physically cut by a laser or the like. As illustrated in FIG. 3, a fuse 31 may be connected on the power line PLC. As the fuse 31, for example, a self control protector (SCP) can be applied. The SCP is a fuse equipped with a heater, and is a device that cuts off the fuse by heating the heater by using electric power of a battery (in this example, the all-solid-state battery 13). By changing a timing at which electric power is supplied to the heater, the fuse can be cut off at any timing. The protection IC 12 performs control for cutting off the fuse 31 at an appropriate timing after the initial charging, and thereby the power line PLC is cut. In this way, the terminal TC is made unusable.

Note that the above processes need not necessarily be performed independently and may be performed in combination.

The all-solid-state battery module 100 and an electronic device including the all-solid-state battery module 100 and other electronic components are manufactured, for example, as follows.

In an initial step, the all-solid-state battery 13 having no potential is mounted on the circuit board 16 by reflow or the like. In this step, the electronic components other than the all-solid-state battery 13 may be mounted on the circuit board 16.

In a next step, a process related to initial charging for charging and activating the all-solid-state battery 13 is performed by using the terminal TC connected to the positive electrode of the all-solid-state battery 13 and the negative electrode terminal TB. When this process is performed, a process of patterning the power line PLC and the terminal TC derived from the power line PLC on the circuit board 16 may be performed in a manner corresponding to a manner of connection of the charge/discharge control switch 14.

In a next step, a process of making the terminal TC unusable is performed.

According to the all-solid-state battery module 100 according to an embodiment described above, for example, the following effects can be obtained.

When the all-solid-state battery 13 is mounted on the circuit board 16 by reflow or the like, the all-solid-state battery 13 has no potential, and it is therefore possible to prevent adverse effects on other electronic components. In addition, it is not necessary to deeply discharge the all-solid-state battery 13 at the time of mounting, and it is therefore possible to prevent the all-solid-state battery 13 from degrading.

Initial charging for activating the all-solid-state battery 13 can be performed on the all-solid-state battery 13 having no potential mounted on the circuit board 16.

After the initial charging, a process of making the terminal TC unusable is performed, and it is therefore possible to, for example, prevent recharging using the terminal TC (charging performed without passing through the charge/discharge control switch 14 serving as a protection circuit) and prevent the terminal TC from being accidentally touched by a user. Therefore, it is possible to start use while ensuring safety of the all-solid-state battery module 100 and the electronic device to which the all-solid-state battery module 100 is applied.

The all-solid-state battery module 100 according to an embodiment can be mounted on or used to supply power to various electronic devices, electric tools, electric vehicles, and the like.

A specific application example will be described. For example, the all-solid-state battery module described above can be used as a power source of a wearable device having a function of a mobile information terminal, that is, as a power source of a wearable terminal. Examples of the wearable terminal include a wristwatch-type terminal and an eyeglass-type terminal, but are not limited thereto.

Figure 5:
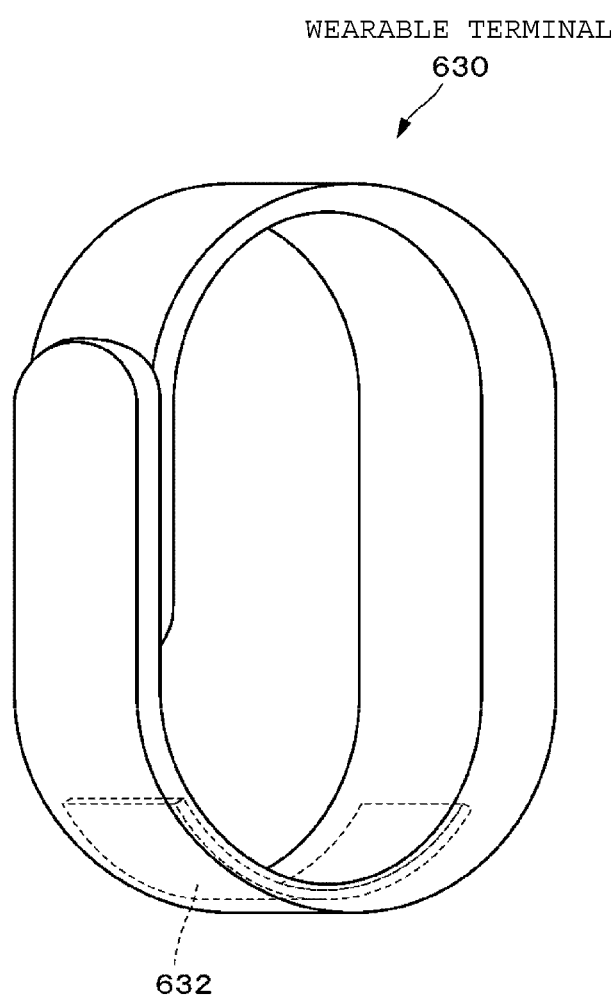
FIG. 5 is a diagram for explaining an application example.

FIG. 5 illustrates an example of a wearable terminal including an all-solid-state battery module. As illustrated in FIG. 5, a wearable terminal 630 according to the application example is a wristwatch-type terminal, and includes a battery pack 632 therein. The all-solid-state battery module according to an embodiment can be applied as the battery pack 632. A user wears the wearable terminal 630 when using the wearable terminal 630. The wearable terminal 630 may be flexible so as to be deformable.

Figure 6:
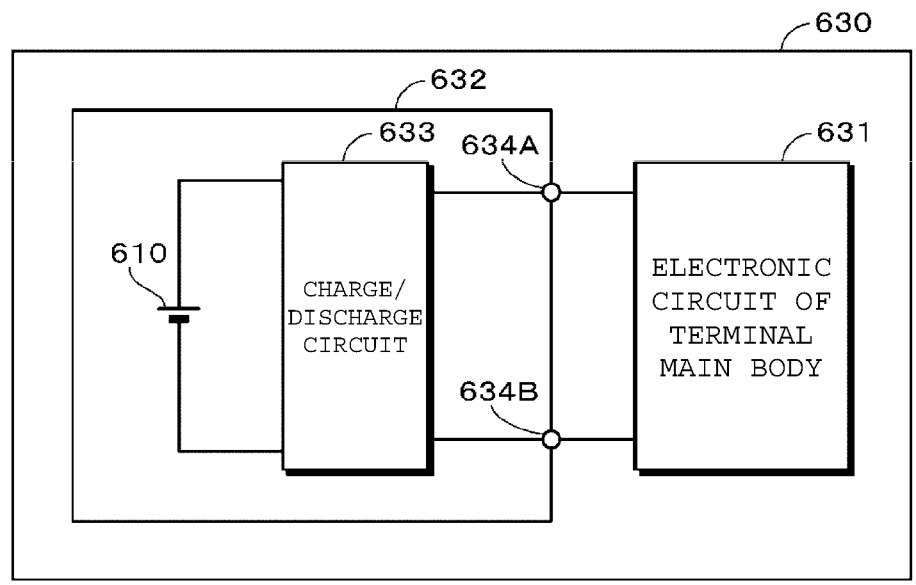
FIG. 6 is a diagram for explaining the application example.

As illustrated in FIG. 6, the wearable terminal 630 according to the application example includes an electronic circuit 631 of an electronic device main body and the battery pack 632. The battery pack 632 is electrically connected to the electronic circuit 631. The wearable terminal 630 is, for example, configured such that the battery pack 632 is attachable and detachable by the user. Note that the configuration of the wearable terminal 630 is not limited to this, and the battery pack 632 may be built in the wearable terminal 630 so that the user cannot remove the battery pack 632 from the wearable terminal 630.

When the battery pack 632 is charged, a positive electrode terminal 634A and a negative electrode terminal 634B of the battery pack 632 are connected to a positive electrode terminal and a negative electrode terminal of a charger (not illustrated), respectively. On the other hand, when the battery pack 632 is discharged (when the wearable terminal 630 is used), the positive electrode terminal 634A and the negative electrode terminal 634B of the battery pack 632 are connected to a positive electrode terminal and a negative electrode terminal of the electronic circuit 631, respectively.

The electronic circuit 631 includes, for example, a CPU, a peripheral logic unit, an interface unit, a storage unit, and the like, and controls the entire wearable terminal 630.

The battery pack 632 includes an all-solid-state battery cell 610 (the all-solid-state battery 13 according to the embodiment) and a charge/discharge circuit 633.

Although an example in which the all-solid-state battery module according to an embodiment is applied as the battery pack 632 has been described in the present application example, the all-solid-state battery module according to an embodiment may be mounted on the electronic circuit 631 of the electronic device main body.

Although the present application has been specifically described above according to an embodiment, the content of the present application is not limited thereto, and various modifications.

Figure 4:
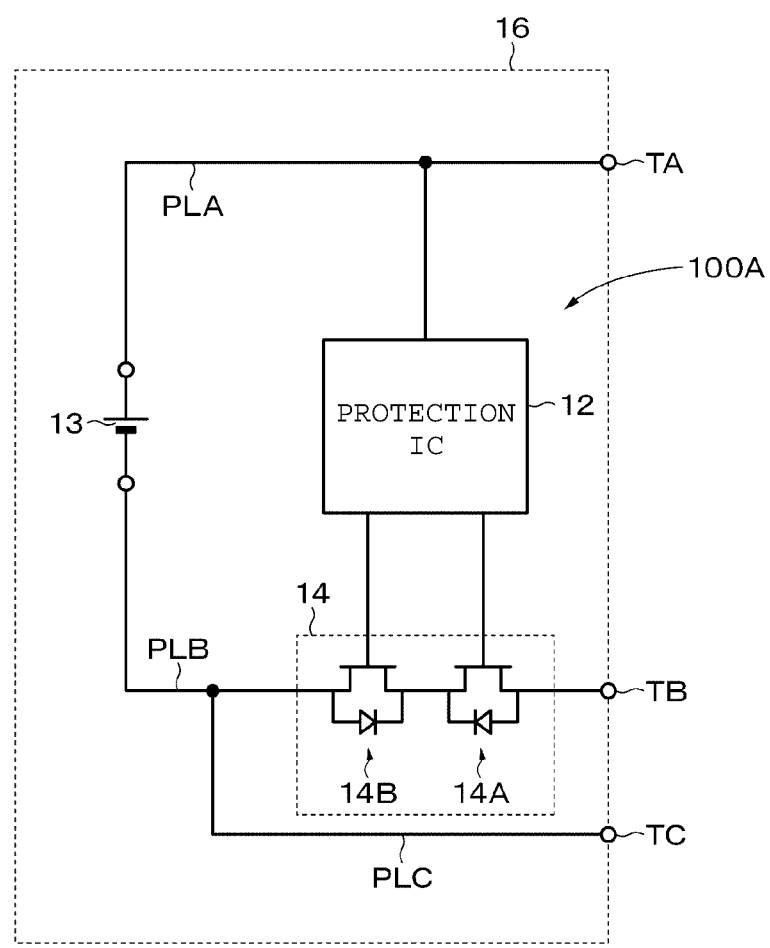
FIG. 4 is a diagram for explaining a modification.

For example, FIG. 4 illustrates a configuration example of an all-solid-state battery module (an all-solid-state battery module 100A) according to a modification. Although the charge/discharge control switch 14 is connected to the power line PLA in the above description, the charge/discharge control switch 14 may be connected on the power line PLB. Furthermore, the power line PLC may be connected between the charge/discharge control switch 14 and the negative electrode of the all-solid-state battery 13. The terminal TC is led out via the power line PLC. Effects similar to those as described herein can be obtained by the configuration of the all-solid-state battery module 100A.

The description of the present application herein can be appropriately combined according to an embodiment. In addition, the materials, processes, and the like described herein are merely examples, and the contents of the present application are not limited thereto.

DESCRIPTION OF REFERENCE SYMBOLS

12: Protection IC
13: All-solid-state battery
14: Charge/discharge control switch
16: Circuit board 1
00: All-solid-state battery module
PLA, PLB, PLC: Power line
TC: Terminal It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An all-solid-state battery module comprising:
   an all-solid-state battery;
   a first electric path connected to a positive electrode of the all-solid-state battery;
   a second electric path connected to a negative electrode of the all-solid-state battery;
   a circuit board on which the all-solid-state battery is mounted; and
   a charge/discharge control switch connected on the first electric path or the second electric path, wherein
   a predetermined charging terminal is connected between the charge/discharge control switch and the positive electrode or between the charge/discharge control switch and the negative electrode.

2. The all-solid-state battery module according to claim 1, further comprising a charge/discharge control unit that controls on/off of the charge/discharge control switch.

3. An electronic device comprising:
   a case; and
   an all-solid-state battery module housed in the case, wherein
   the all-solid-state battery module includes
   an all-solid-state battery,
   a first electric path connected to a positive electrode of the all-solid-state battery,
   a second electric path connected to a negative electrode of the all-solid-state battery,
   a circuit board on which the all-solid-state battery is mounted, and
   a charge/discharge control switch connected on the first electric path or the second electric path, and
   a predetermined charging terminal is connected between the charge/discharge control switch and the positive electrode or between the charge/discharge control switch and the negative electrode.

4. The electronic device according to claim 3, wherein the charging terminal is subjected to processing for restricting use from an outside of the case.

5. The electronic device according to claim 4, wherein the charging terminal is configured not to be exposed to the outside from the case.

6. The electronic device according to claim 4, wherein a third electric path is provided between the charging terminal and the positive electrode or the negative electrode of the all-solid-state battery, and the third electric path is cuttable.

7. A method for manufacturing an all-solid-state battery module, the method comprising:
   mounting an all-solid-state battery having no potential on a circuit board; and
   charging and activating the all-solid-state battery via a predetermined charging terminal connected between a charge/discharge control switch and a positive electrode or a negative electrode of the all-solid-state battery, the charge/discharge control switch being connected on a first electric path connected to the positive electrode of the all-solid-state battery or on a second electric path connected to the negative electrode of the all-solid-state battery.

* * * * *